United States Patent

Van Der Sluis et al.

(10) Patent No.: US 9,423,003 B2
(45) Date of Patent: Aug. 23, 2016

(54) DRIVE BELT COMPRISING DIFFERENT TYPES OF TRANSVERSE MEMBERS FOR A CONTINUOUSLY VARIABLE TRANSMISSION

(71) Applicants: Francis Maria Antonius Van Der Sluis, Sint-Michielsgestel (NL); Joost Johannes Cornelis Jonkers, Gilze (NL)

(72) Inventors: Francis Maria Antonius Van Der Sluis, Sint-Michielsgestel (NL); Joost Johannes Cornelis Jonkers, Gilze (NL)

(73) Assignee: ROBERT BOSCH GMBH, Stuttgart (DE)

( * ) Notice: Subject to any disclaimer, the term of this patent is extended or adjusted under 35 U.S.C. 154(b) by 251 days.

(21) Appl. No.: 14/368,871

(22) PCT Filed: Dec. 24, 2012

(86) PCT No.: PCT/NL2012/000080
§ 371 (c)(1),
(2) Date: Jun. 26, 2014

(87) PCT Pub. No.: WO2013/100760
PCT Pub. Date: Jul. 4, 2013

(65) Prior Publication Data
US 2014/0371015 A1    Dec. 18, 2014

(30) Foreign Application Priority Data

Dec. 29, 2011  (NL) .................................... 1039273

(51) Int. Cl.
*F16G 5/16*    (2006.01)
(52) U.S. Cl.
CPC .................................... *F16G 5/16* (2013.01)

(58) Field of Classification Search
CPC ............ F16G 5/16; F16G 5/18; F16G 13/02; F16G 1/24
USPC .................................................. 474/242, 240
See application file for complete search history.

(56) References Cited

U.S. PATENT DOCUMENTS

| 4,516,963 A * | 5/1985 | Mott | .................... F16G 5/18 |
| | | | 474/201 |
| 4,794,741 A * | 1/1989 | van Dijk | .................... B24C 1/00 |
| | | | 451/332 |

(Continued)

FOREIGN PATENT DOCUMENTS

| EP | 0 305 023 A1 | 3/1989 |
| EP | 1 178 240 A2 | 2/2002 |
| JP | 61 103651 U | 7/1986 |

OTHER PUBLICATIONS

International Search Report, dated Apr. 22, 2013, from corresponding PCT application.

*Primary Examiner* — William E Dondero
*Assistant Examiner* — Robert T Reese
(74) *Attorney, Agent, or Firm* — Young & Thompson

(57) ABSTRACT

A drive belt (3) includes an endless carrier (31) and a plurality of transverse members (32) of varying thickness, i.e. of varying dimension measured in the circumference direction "L" of the belt (3), which transverse members (32) are provided with a rocking edge (18) in the form an axially and radially extending section of a respective main body surface (38; 39) of the transverse member (32) that is convexly curved in radial direction. According to the invention, the design of such drive belt (3) can be improved, at least in terms of durability, by shaping the rocking edge (18) of the thinner transverse members (32) of such drive belt (3) according a larger radius of curvature in comparison with the radius of curvature of the rocking edge (18) of thicker transverse members (32) thereof.

4 Claims, 2 Drawing Sheets

(56) References Cited

U.S. PATENT DOCUMENTS

Figure 4:
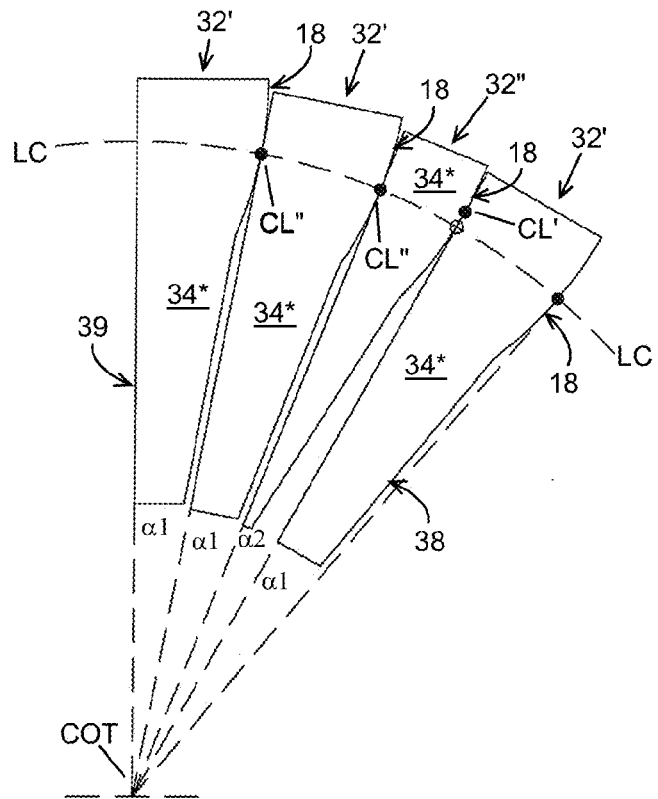

| | | | |
|---|---|---|---|
| 4,824,424 A * | 4/1989 | Ide | F16G 5/16 474/201 |
| 6,578,249 B2 * | 6/2003 | Fujioka | F16G 5/16 29/428 |
| 2001/0051554 A1 | 12/2001 | Kanehara et al. | |
| 2008/0009378 A1 * | 1/2008 | Kanehara | F16G 5/16 474/242 |
| 2009/0182446 A1 * | 7/2009 | Hattori | F16G 5/16 700/103 |
| 2012/0190490 A1 * | 7/2012 | Morino | F16G 5/16 474/240 |
| 2015/0045166 A1 * | 2/2015 | Van Der Sluis | F16G 5/16 474/201 |

\* cited by examiner

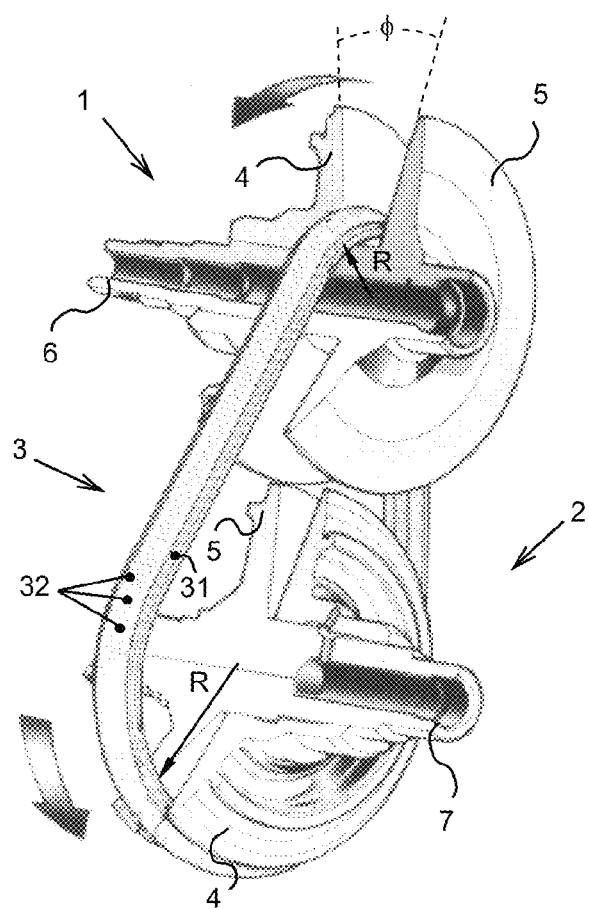
FIG. 1
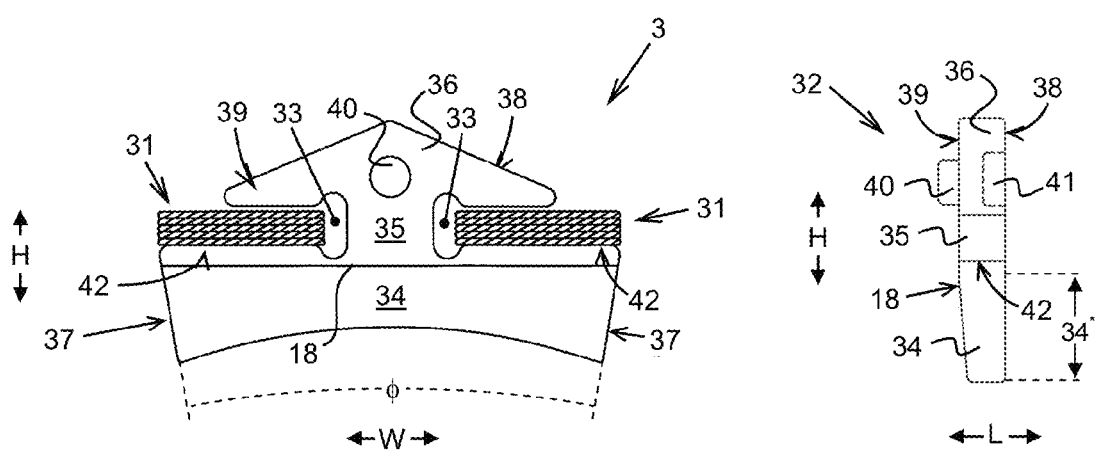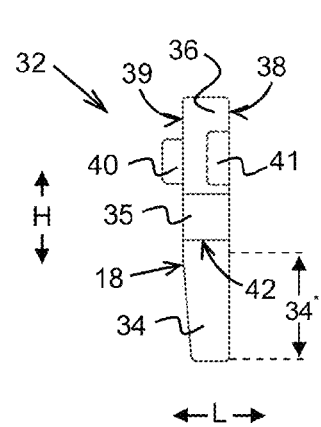
FIG. 2    FIG. 3

DRIVE BELT COMPRISING DIFFERENT TYPES OF TRANSVERSE MEMBERS FOR A CONTINUOUSLY VARIABLE TRANSMISSION

The present invention relates to a drive belt for a continuously variable transmission, which is in particular destined to be arranged around two pulleys of the transmission and which comprises a plurality of discrete transverse elements or members for contacting the transmission pulleys, as well as one or more endless, i.e. ring shaped, carriers for carrying and guiding the transverse members in the transmission. The present type of drive belt is also known as a push belt.

Each endless carrier of the drive belt is typically composed of a plurality of mutually nested, continuous flexible metal bands and is also known as a ring set. Each endless carrier is at least partly inserted in a recess provided in the transverse members. In case the drive belt comprises only one endless carrier, such carrier is typically mounted in a central recess of the transverse members that opens towards the radial outside of the drive belt. However, usually the drive belt is provided with at least two endless carriers that are each mounted in a respective one of two recesses of the transverse members, which recesses then open towards a respective axial or lateral side of the transverse members, i.e. of the drive belt.

The transverse members of the drive belt are slidingly arranged along the circumference of the endless carrier or carriers in a virtually continuous row, such that these members are able to transmit forces which are related to a movement of the drive belt. The transverse members have two main body surfaces which, at least partly, extend substantially parallel with respect to each other and which are separated from each other over the (local) thickness of the transverse member by a circumferential side surface. As seen along the circumference of the carrier, the transverse members have a comparatively small dimension, i.e. thickness, such that a several hundreds thereof are present in the drive belt. Adjoining transverse members are designed to be able to tilt relative to one another, such that the belt is able to follow a curved trajectory. To accommodate and control such relative tilting, at least one of the two main body surfaces of the two adjoining transverse members in the drive belt that are mutually in contact is provided with a so-called rocking edge in the form of an axially and radially extending section of the respective main body surface(s) that is convexly curved in radial direction. In this respect it is noted that the radial direction is defined relative to the drive belt when it is placed in a circular trajectory.

Parts of the side surface of the transverse members, which parts are predominantly oriented in the axial direction, i.e. widthwise, are corrugated and are intended for frictionally contacting the transmission pulleys, in particular by being clamped widthwise between two conical sheaves of such pulleys. The friction contact between the transverse members and the pulley sheaves allows a force to be transmitted there between, such that the drive belt can transfer a drive torque and rotational movement from one transmission pulley to the other.

Although, typically, the majority of the transverse members of a drive belt are identically shaped, it is also well-known to include two or more types of transverse members of mutually different design into a single drive belt. In this latter respect, it is known in the art to provide the drive belt with transverse members having a mutually different thickness, i.e. the transverse members of a first type being thinner (or thicker) than the transverse members of a second type. For example, in the European patent publication EP1178240 (A2) it is described to include three types of transverse members into a single drive belt, whereof each type shows a different thickness, in order to efficiently reduce the amount of clearance between the transverse members in the row of transverse members that spans the circumference of the endless carrier(s) in the drive belt. Further, from the European patent publication EP0305023 (A1) it is known to provide the drive belt with two or more types of transverse members of mutually different thickness and to randomly mix these transverse members amongst another as they are incorporated in the drive belt along the circumference of the endless carrier(s) thereof, in order to attenuate the noise caused by the transverse members successively impacting the transmission pulleys during operation of the transmission.

It is an object of the present invention to improve the design and operation of this known drive belt including transverse members of different thickness. More in particular, the present invention aims to reduce the load exerted on and between the transverse members in the curved trajectory of the drive belt.

The invention departs from on the technical insight that the said mutual tilting of two adjoining transverse members relative to one another is accompanied by a displacement of a—predominantly axially oriented—line of contact between these two transverse members—in a predominantly radial direction—over the rocking edge. In other words, one of the mutually contacting front and rear main body surfaces of the transverse members roll-off relative to the other one main body surface. In such arrangement, i.e. in the known drive belt, the radial displacement of the line of contact between the two adjoining, relatively tilting transverse members depends not only on the amount of relative tilting, i.e. the tilting angle between the transverse members, but also on the radius or radii of curvature of the rocking edge, i.e. the rocking edge radius. A larger tilting angle and/or a larger rocking edge radius results in a larger radial displacement as compared to a smaller tilting angle and/or a smaller rocking edge radius. Further underlying the invention is the notion that in a constantly curved part of the drive belt, such as those parts that are wrapped around and in contact with the transmission pulleys, the tilting angle between each pair of adjoining transverse members in such curved belt part (thus) depends on the thickness of these transverse members.

Thus, in a drive belt including transverse members of mutually different thickness, different tilting angles occur between the pairs of adjoining transverse members even in a constantly curved belt part. These different tilting angles result in a different radial displacement and hence in a different radial position of the axial contact line between the adjoining transverse members on the rocking edge. A transverse member is disadvantageously and additionally loaded by bending forces, if the radial position of contact with a preceding transverse member differs from the radial position of contact with a succeeding transverse member. Moreover, such phenomenon may cause an undesired, additional rotation and/or sliding of the transverse members relative to the pulley sheaves.

The invention aims to overcome or at least reduce above-described phenomenon and the disadvantages that are associated therewith by providing the drive belt with the technical features of claim 1 hereinafter. Thus, in accordance with the invention, the convex curvature of the rocking edge of a transverse member is related to the thickness of that particular transverse member. In particular, in the drive belt, a curving of the rocking edge of a (relatively) thin transverse member is less than that of a (relatively) thick transverse member. As a result, a larger radial displacement of the axial contact line is realized in the contact between two thin transverse members, in relation to the tilting angle there between, as compared to the contact between two thick transverse members.

Preferably, the said convex curvature of the rocking edge of the transverse members of different thickness, are mutually adapted in such a manner that, in a constantly curved belt part, the same radial displacement of the axial contact line is provided between each pair of adjoining transverse members in such part. If, as is in practice often the case, the convex curvature of the rocking edge is defined according to a constant, i.e. single radius of curvature, the said mutual adaptation can be mathematically expressed as follows:

$$RER_2 = \frac{D_2^2 + 2 * RER_1 * D_1 - D_1^2}{2 * D_2} \quad (1)$$

with:

$RER_1$ representing the radius of curvature of the rocking edge of a first type of transverse member, $D_1$ representing the thickness of that first type of transverse member, $D_2$ representing the thickness of a second type of transverse member, and $RER_2$ representing the radius of curvature of the rocking edge of that second type of transverse member.

The above equation (1) is also applicable if more than two types of transverse member of mutually different thickness are applied in the drive belt. In such case the equation (1) is applicable to each pair of two of such types of transverse members.

The invention will be explained in more detail on the basis of the following description of the invention with reference to the drawing and in relation to a preferred embodiment thereof. In the drawing figures equal reference signs indicate equal or similar structures and/or parts.

FIG. 1 provides a schematic perspective view of the continuously variable transmission with a drive belt running over two pulleys, which drive belt includes an endless carrier, as well as a number of transverse members.

FIG. 2 shows a cross section of the known drive belt viewed in the circumference direction thereof.

FIG. 3 provides a width-wise oriented view of a transverse member of the known drive belt.

FIG. 4 provides a schematic close-up of a curved part of the drive belt, which part is provided with, otherwise identically shaped, transverse members of mutually different thickness.

Figure 5:
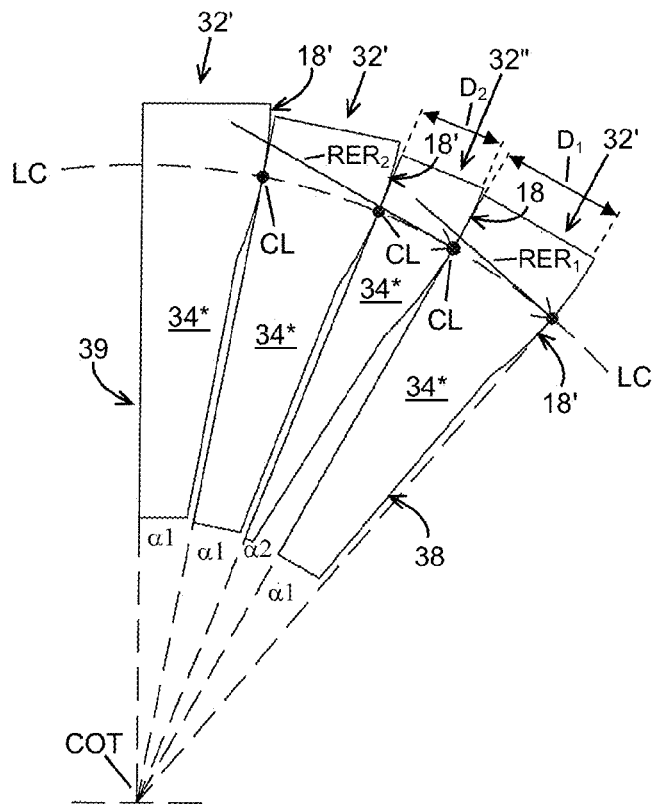

FIG. 5 provides a schematic close-up of a curved part of the drive belt similar to FIG. 4, however whereof the transverse members are not only provided with a mutually different thickness, but also with a mutually differently curved rocking edge.

The schematic illustration of a continuously variable transmission in FIG. 1 shows a drive belt 3 which runs over two pulleys 1, 2 and which includes a closed, i.e. endless carrier 31 and an essentially contiguous row of transverse members 32 that are mounted on and arranged along the circumference of the carrier 31. In the illustrated position, the upper pulley 1 rotates more quickly than the lower pulley 2. By changing the distance between the two conical sheaves 4, 5 of each pulley 1, 2, the so-called running radius R of the drive belt 3 on the respective pulleys 1, 2 can be changed and, as a result, the rotational speed ratio i between the two pulleys 1, 2 can be varied. This is a known manner of varying a difference in rotational speed between an input shaft 6 and an output shaft 7 of the transmission.

In FIG. 2, the drive belt 3 is shown in a cross section thereof facing in the circumference or length direction L of the belt 3, i.e. facing in a direction perpendicular to the axial or width W direction and the radial or height H direction thereof. This FIG. 2 shows the presence of two endless carriers 31 that are shown in cross-section and that carry and guide the transverse members 32 of the drive belt 3, whereof one transverse member 32 is shown in front elevation.

The transverse members 32 and the endless carriers 31 of the drive belt 3 are typically made of metal, usually steel. The transverse members 32 take-up a clamping force exerted between the sheaves 4, 5 of each pulley 1, 2 via pulley contact faces 37 that are provided on either axial side thereof. These pulley contact faces 37 are mutually diverging in radial outward direction to essentially match a V-angle defined between the two sheaves 4, 5 of each pulley 1, 2. The transverse members 32 are able to move, i.e. to slide along the endless carriers 31 in the circumference direction L, so that when a force is transmitted between the transmission pulleys 1, 2, this force is transmitted by the transverse members 32 pressing against one another and pushing each other forward in a direction of rotation of the drive belt 3 and the pulleys 1, 2. The endless carriers 31 hold the drive belt 3 together and, in this particular exemplary embodiment, are composed of five individual endless bands each, which endless bands are mutually concentrically nested to form the endless carrier 31. In practice, the endless carriers 31 often comprise more than five endless bands, e.g. up to twelve or more.

The transverse member 32, which is also shown in side view in FIG. 3, is provided with two cut-outs 33 located opposite one another and opening towards opposite sides of the transverse member 32. Each cut-out 33 accommodates a respective one of the two endless carriers 31. A first or base portion 34 of the transverse member 32 thus extends radially inwards from the endless carriers 31, a second or middle portion 35 of the transverse member 32 is situated in between the endless carriers 31 and a third or top portion 36 of the transverse member 32 extends radially outwards from the endless carriers 31. The radially inward side of a respective cut-out 33 is delimited by a so-called bearing surface 42 of the base portion 34 of the transverse member 32, which bearing surface 42 faces radially outwards in the general direction of the top portion 36. This bearing surface 42 contacts the inside of the endless carrier 31, especially in the parts of the drive belt 3 that are wrapped around and in contact with the transmission pulleys 1, 2.

A first or rear surface 38 of the two main body surfaces 38, 39 of transverse member 32 that face in mutually opposite circumference directions L, is essentially flat. The other or front main body surface 39 of the transverse member 32 is provided with a so-called rocking edge 18 that forms, in the radial direction H, the transition between an upper part of the front surface 39, extending essentially in parallel with its rear surface 38, and a lower part thereof that is slanted such that it extends towards the rear surface 38. In FIG. 2 the rocking edge 18 is indicated only schematically by way of a single line, however, in practice the rocking edge 18 is mostly provided in the shape of section 18 of the said front surface 39, which section 18 is straight and flat in the axial direction W, but is convexly curved in the radial direction H. Thus, an upper part of the transverse member 32 that is located radially outward from/above the rocking edge 18 is provided with an essentially constant dimension between the main body surfaces 38, 39 thereof, i.e. as seen in the circumference direction, which dimension is typically referred to as the thickness of the transverse member 32.

In FIG. 4 a lower part 34* from the upper end of the rocking edge 18 downward (see also FIG. 3) of several transverse members 32 is shown in a mutually rotated position that is representative of a part of the drive belt 3 that is wrapped around and in contact with a transmission pulley 1, 2, while rotating around the center of rotation COT of that pulley 1, 2. FIG. 4 covers a group four adjacent transverse members 32 in the said part of the drive belt 3, whereof one transverse member 32" is thinner than the other, i.e. thicker transverse members 32'. It is noted that FIG. 4 is not drawn to scale in order to more clearly illustrate the present invention.

From the FIG. 4 it follows that an axially oriented line of contact CL exists between two adjacent transverse members 32', 32", which contact line CL is located on the rocking edge 18 and which contact line CL displaces in radially inward direction over the convex curvature of rocking edge 18, as a tilting angle α1, α2 between such two adjacent transverse members 32', 32" increases. Because the drive belt 3 is provided with two types of transverse members 32', 32", whereof a first type 32' is thicker, but is otherwise shaped identical to a second type 32", the tilting angle α1, α2 between the transverse members 32', 32" varies, even in a constantly curved part of the drive belt 3 as illustrated in this FIG. 4. As a result the contact lines CL', CL" between all pairs of adjacent transverse members 32', 32" are not (all) located at the same radial position (compare circle LC with contact line CL' and contact lines CL" respectively). In fact, because the tilting angle α2 between the thinner succeeding transverse member 32' and its respectively preceding transverse member 32" is comparatively small, the contact line LC" between these two transverse members 32' and 32" lies radially outward from the contact lines LC' on the rocking edges 18 of thicker transverse members 32'.

Although the drive belt 3 illustrated in FIG. 4 may function well per se, the transverse members 32 thereof are to certain extend unequally and/or disadvantageously loaded during operation of the drive belt 3 by the (reaction) forces that are exerted between the transverse members 32 on the front and rear main body surfaces 38, 39 thereof at the location of a respective contact line CL.

An improvement in the design of the drive belt 3 is realized in accordance with the invention by providing that a radius of curvature RER of the rocking edge 18 of a transverse member 32 is inversely proportional to a thickness of that particular transverse member 32, relative to other transverse members 32 of the drive belt 3 of different thickness. In other words, in a drive belt 3 comprising two types of transverse members 32', 32" of mutually different thickness, a radius of curvature $RER_1$ of the rocking edge 18' of the comparatively thick transverse members 32' is smaller than a radius of curvature $RER_2$ of the rocking edge 18' of the comparatively thin transverse members 32".

This latter drive belt design is illustrated in FIG. 5. in fact, in the example of FIG. 5, the distinguishable radii of curvature $RER_1$ and $RER_2$ are exactly tailored to the respective thickness $D_1$ and $D_2$ of the two types of transverse member 32' and 32", whereby the contact line CL between any pair of adjoining transverse members 32', 32" in a constantly curved part the drive belt 3 is located on a common (virtual) circle LC, at least by close approximation.

It will be clear to a person skilled in the art that the scope of the present invention is not limited to the examples discussed above, but that several amendments and modification thereof are possible without deviating from the scope of the invention as defined in the appended claims.

The invention claimed is:

1. Drive belt (3) with an endless carrier (31) and a number of consecutive transverse members (32) mounted slidable on the endless carrier (31), each provided with a front main body surface (39) and with a rear main body surface (38), where between the transverse member (32) extends in thickness direction and whereof at least one is provided with a convexly curved part (18), of which transverse members (32) at least two types having a mutually different dimension in the thickness direction are included in the drive belt (3), characterized in that a radius of curvature of the convexly curved part (18) of the type of transverse members (32') having the largest dimension in the thickness direction is smaller than the radius of curvature of the convexly curved part (18) the type of transverse members (32") having the smallest dimension in the thickness direction.

2. The drive belt (3) according to claim 1, characterized in that a proportion between the said different radii of curvature of the convexly curved part (18) of the transverse members (32') of the dimensions in the thickness direction of the transverse members (32) are equally present between the different dimensions in the width direction of those transverse members (32) of different dimensions in the thickness direction.

3. The drive belt (3) according to claim 2, characterized in that transverse members (32) thereof satisfy the equation:

$$RER_2 = \frac{D_2^2 + 2*RER_1*D_1 - D_1^2}{2*D_2} \quad (1)$$

wherein:
$RER_1$ is the radius of curvature of the convexly curved part (18) of a first type of transverse members (32') in the drive belt (3),
$D_1$ is the dimension in the thickness direction of such first type of transverse members (32'),
$RER_2$ is the radius of curvature of the convexly curved part (18) of a second type of transverse members (32"), and
$D_2$ is the dimension in the thickness direction of such second type of transverse members (32").

4. The drive belt (3) according to claim 1, characterized in that transverse members (32) thereof satisfy the equation:

$$RER_2 = \frac{D_2^2 + 2*RER_1*D_1 - D_1^2}{2*D_2} \quad (1)$$

wherein:
$RER_1$ is the radius of curvature of the convexly curved part (18) of a first type of transverse members (32') in the drive belt (3),
$D_1$ is the dimension in the thickness direction of such first type of transverse members (32'),
$RER_2$ is the radius of curvature of the convexly curved part (18) of a second type of transverse members (32"), and
$D_2$ is the dimension in the thickness direction of such second type of transverse members (32").

* * * * *